US011910781B2

(12) United States Patent
Roberts et al.

(10) Patent No.: US 11,910,781 B2
(45) Date of Patent: Feb. 27, 2024

(54) ANALYZING MEDIA BASED ON NON-HUMAN ANIMAL INPUT

(71) Applicant: Organic Intelligence Technologies, Inc., Sanford, NC (US)

(72) Inventors: David Louis Roberts, Raleigh, NC (US); John F. Wiederhirn, San Jose, CA (US)

(73) Assignee: Organic Intelligence Technologies, Inc., Sanford, NC (US)

( * ) Notice: Subject to any disclaimer, the term of this patent is extended or adjusted under 35 U.S.C. 154(b) by 555 days.

(21) Appl. No.: 16/727,080

(22) Filed: Dec. 26, 2019

(65) Prior Publication Data
US 2021/0195867 A1    Jul. 1, 2021

(51) Int. Cl.
| G08B 23/00 | (2006.01) |
| A01K 15/02 | (2006.01) |
| G06V 10/764 | (2022.01) |
| G06V 20/52 | (2022.01) |
| G06V 40/10 | (2022.01) |
| A01K 29/00 | (2006.01) |

(52) U.S. Cl.
CPC .......... *A01K 15/021* (2013.01); *G06V 10/764* (2022.01); *G06V 20/52* (2022.01); *G06V 40/10* (2022.01); *A01K 29/005* (2013.01)

(58) Field of Classification Search
CPC .............. G06K 9/00362; A01K 15/021; A01K 29/005; G06V 20/52; G06V 10/764
See application file for complete search history.

(56) References Cited

U.S. PATENT DOCUMENTS

| 4,671,210 A | * | 6/1987 | Robinson | A01K 5/0291 |
| | | | | 119/51.12 |
| 4,890,577 A | * | 1/1990 | Maibach | A01K 5/0258 |
| | | | | 119/52.1 |
| 5,657,721 A | * | 8/1997 | Mayfield | A01K 15/025 |
| | | | | 446/175 |

(Continued)

FOREIGN PATENT DOCUMENTS

| KR | 1020140117394 A | 10/2014 |
| KR | 1020190107857 A | 9/2019 |

OTHER PUBLICATIONS

DeLellis et al., Collective behaviour across animal (Year: 2014).*

(Continued)

*Primary Examiner* — Quang Pham
(74) *Attorney, Agent, or Firm* — Polygon IP, LLP (57) ABSTRACT

A computing system classifies each of a plurality of media units as either having or not having a characteristic of interest by testing the media units using a plurality of non-human animals. The testing comprises, for each of the media units and responsive to detecting a non-human animal at a location, sending the media unit to a media output device perceivable by the non-human animal from the location. The testing further comprises, for each of the media units, determining the classification of the media unit as either having or not having the characteristic of interest based on data derived, at least in part, from an input sensor configured to accept input from the non-human animal while the non-human animal is at the location.

29 Claims, 6 Drawing Sheets

(56) References Cited

U.S. PATENT DOCUMENTS

| | | | | |
|---|---|---|---|---|
| 5,749,324 | A * | 5/1998 | Moore | A01K 27/009 119/718 |
| 5,956,463 | A * | 9/1999 | Patrick | G10L 15/16 704/E15.017 |
| 6,016,100 | A * | 1/2000 | Boyd | A01M 31/002 340/573.2 |
| 6,202,595 | B1 * | 3/2001 | Atcravi | A01K 1/0114 119/165 |
| 6,761,131 | B2 * | 7/2004 | Suzuki | A01K 29/00 704/E17.002 |
| 7,269,516 | B2 * | 9/2007 | Brunner | G16H 10/20 382/128 |
| 8,100,084 | B1 * | 1/2012 | Abramson | A01K 5/0283 119/57.2 |
| 8,915,215 | B1 * | 12/2014 | Helgeson | A01K 45/00 119/421 |
| 9,485,966 | B1 * | 11/2016 | Betts-Lacroix | H05B 3/0033 |
| 9,734,692 | B2 * | 8/2017 | Korakin | G01S 15/04 |
| 10,511,890 | B1 | 12/2019 | Ramesh | |
| 10,856,527 | B1 * | 12/2020 | Kreischer | A01K 15/021 |
| 10,959,398 | B1 * | 3/2021 | Betts-Lacroix | G06V 10/143 |
| 11,516,992 | B2 * | 12/2022 | Yabe | G06V 10/764 |
| 2003/0024482 | A1 * | 2/2003 | Gondhalekar | A01K 29/005 119/422 |
| 2003/0058740 | A1 * | 3/2003 | Jincks | A01M 31/002 367/139 |
| 2003/0105412 | A1 * | 6/2003 | Mauderli | A61B 5/4824 600/555 |
| 2005/0049877 | A1 * | 3/2005 | Agranat | A01K 11/008 704/E17.002 |
| 2006/0201433 | A1 * | 9/2006 | Kates | A01K 15/02 119/51.02 |
| 2007/0083896 | A1 * | 4/2007 | Staples | G08B 13/19669 725/142 |
| 2007/0193524 | A1 * | 8/2007 | Turner | A01K 5/0291 119/51.02 |
| 2008/0236514 | A1 * | 10/2008 | Johnson | A01K 15/021 340/573.3 |
| 2008/0302305 | A1 * | 12/2008 | Beaudoin | A01K 5/0233 700/240 |
| 2010/0289643 | A1 * | 11/2010 | Trundle | F24F 11/47 340/3.1 |
| 2010/0331722 | A1 * | 12/2010 | Caudle | A01K 29/00 600/557 |
| 2011/0082574 | A1 * | 4/2011 | Pachet | A01K 29/005 700/94 |
| 2011/0126775 | A1 * | 6/2011 | Seltzer | A01K 1/033 119/500 |
| 2012/0077159 | A1 * | 3/2012 | Araujo | A01K 1/035 434/236 |
| 2012/0180731 | A1 * | 7/2012 | Garner | A01K 1/031 119/417 |
| 2012/0234256 | A1 * | 9/2012 | Harte | A01K 15/02 119/421 |
| 2012/0239174 | A1 * | 9/2012 | Shotton | G06V 40/10 382/218 |
| 2012/0240863 | A1 * | 9/2012 | Araujo | A01K 5/02 119/51.01 |
| 2012/0312247 | A1 * | 12/2012 | Ebersole | A01K 15/02 340/573.3 |
| 2013/0014706 | A1 * | 1/2013 | Menkes | A01K 27/001 119/859 |
| 2013/0319338 | A1 * | 12/2013 | Davis | A01K 5/0114 119/57.1 |
| 2013/0333633 | A1 * | 12/2013 | Poon | A61B 5/12 600/301 |
| 2014/0331936 | A1 * | 11/2014 | Araujo | A01K 15/02 119/51.01 |
| 2016/0007565 | A1 * | 1/2016 | Trottier | A01K 5/0275 119/51.01 |
| 2016/0270364 | A1 * | 9/2016 | Woolf | G06T 7/20 |
| 2016/0295832 | A1 * | 10/2016 | Trottier | A01K 5/0258 |
| 2016/0323971 | A1 * | 11/2016 | Theobald | A01K 31/04 |
| 2017/0006824 | A1 * | 1/2017 | Baron | A01K 5/02 |
| 2017/0027135 | A1 * | 2/2017 | Suntych | A01K 29/005 |
| 2018/0184623 | A1 * | 7/2018 | Suntych | A01K 45/00 |
| 2019/0289360 | A1 * | 9/2019 | Choi | H04N 21/44 |
| 2020/0060225 | A1 * | 2/2020 | Roberson | A01K 1/031 |
| 2020/0352134 | A1 * | 11/2020 | Last | A01K 45/00 |
| 2021/0153456 | A1 * | 5/2021 | Mundell | A01K 15/021 |
| 2022/0022426 | A1 * | 1/2022 | Berckmans | A01K 29/00 |
| 2022/0378017 | A1 * | 12/2022 | Ye | G06F 3/04847 |
| 2023/0083421 | A1 * | 3/2023 | Mundell | G06V 40/23 119/712 |

OTHER PUBLICATIONS

Rast et al., Machine learning goes wild Using data from captive individuals to infer wildlife behaviours (Year: 2020).*

Statham et al., Quantifying defence cascade responses as indicators of pig affect and welfare using computer vision methods (Year: 2020).*

Perez, S., "Can Mice Detect Deepfake Videos?", online article, Aug. 27, 2019, pp. 1-4, obtained on Sep. 11, 2019, obtained from: https://it.toolbox.com/article/can-mice-detect-deepfake-videos.

International Application Serial No. PCT/US20/66724, Search Report and Written Opinion dated Apr. 21, 2021, 13 pgs.

* cited by examiner

ANALYZING MEDIA BASED ON NON-HUMAN ANIMAL INPUT

BACKGROUND

With media capture devices becoming increasingly pervasive, humankind is undoubtedly producing more media now than at any other time in human history. With such an extraordinary abundance of media being generated, a significant problem arises in understanding, with any significant detail, completeness or sophistication of what has been produced. Surveillance cameras, camera phones, voice control systems, broadcast television, internet video, telemedicine, satellite imagery, tomography, radio telescopes, and more all contribute to the vast corpus of media being regularly produced worldwide. In view of this vast amount of media, it is apparent that if a reasonable understanding of all this media information is to be discerned, human analysts alone cannot hope to keep pace.

Accordingly, humankind has enlisted the assistance of computers to enable more efficient methods of analysis and classification of media. Notwithstanding, many problems relating to media classification that are quite trivial for human judgment to solve are quite challenging for computers to resolve. In view of this fact, security systems are quite common that, for example, rely on the superior ability of humans to classify images as compared to computers. Completely Automated Public Turing test to tell Computers and Humans Apart (CAPTCHA) is just one example of a security technique that relies on the superior ability of humans to classify media (relative to computers) in order to identify and prevent automated access to network resources.

Notwithstanding, computer vision is an example field of artificial intelligence that trains computers to more acutely understand visual input. Similar examples exist for audio and other data. Thus, techniques are being discovered and applied to improve the capabilities of computers in classifying media. Nonetheless, the use of artificial intelligence, deep learning models, and other such approaches are often highly experimental, of dubious reliability, and/or computationally expensive. Accordingly, while it may be advantageous in principle to substitute computer analysis for human judgment in order to classify media, this remains difficult in practice given that many artificial intelligence techniques are still in their adolescence in certain respects.

SUMMARY

Embodiments of the present disclosure generally relate to a computer system that classifies media based on non-human animal input. For purposes of explanation, the term "animal" as used throughout this disclosure specifically excludes human beings. Therefore, the terms "animal" and "non-human animal" are properly construed to mean the same thing, and are used interchangeably within the context of this disclosure.

Particular embodiments of the present disclosure include a method, implemented by a computing system. The method comprises classifying each of a plurality of media units as either having or not having a characteristic of interest by testing the media units using a plurality of non-human animals. The testing comprises, for each of the media units and responsive to detecting a non-human animal at a location, sending the media unit to a media output device perceivable by the non-human animal from the location. The testing further comprises, for each of the media units, determining the classification of the media unit as either having or not having the characteristic of interest based on data derived, at least in part, from an input sensor configured to accept input from the non-human animal while the non-human animal is at the location.

In some embodiments, testing the media units using the plurality of non-human animals further comprises detecting the non-human animals at a plurality of different locations and sending the media units to the different locations as the non-human animals are detected.

In some embodiments, detecting the non-human animal at the location comprises detecting that the non-human animal has entered a testing chamber comprising the media output device and the input sensor.

In some embodiments, the method further comprises, responsive to detecting the non-human animal at the location, selecting a reinforcement scheme from a plurality of reinforcement schemes to provide to the non-human animal, and signaling a remote device at the location to reinforce behavior of the non-human animal in accordance with the selected reinforcement scheme based on the data. In some such embodiments, the selected reinforcement scheme comprises providing the non-human animal with sensory stimulus and/or dispensing sustenance.

In some embodiments, the testing further comprises, for each of the media units, identifying the non-human animal at the location and maintaining a historical performance record for the identified non-human animal based on the data derived, at least in part, from the input sensor. In some such embodiments, maintaining the historical performance record for the identified non-human animal comprises tracking a response time of the non-human animal. In some embodiments, the method additionally or alternatively further comprises detecting an anomaly in performance of the identified non-human animal as compared against the historical performance record of the identified non-human animal and transmitting a warning regarding a status of the identified non-human animal. In some embodiments, determining the classification of the media unit as either having or not having the characteristic of interest is further based on the historical performance record of the identified non-human animal.

In some embodiments, the method further comprises activating a remote device to attract a selected non-human animal of the plurality of non-human animals to the location.

In some embodiments, the method further comprises dynamically generating at least one of the media units from component media parts.

In some embodiments, classifying each of the plurality of media units as either having or not having the characteristic of interest comprises classifying each of the plurality of media units as either comprising or not comprising content of interest, respectively.

In some embodiments, the method further comprises determining, for a media unit having the characteristic of interest and based on the data, a segment of the media unit in which the characteristic of interest is present.

In some embodiments, the plurality of non-human animals comprises a plurality of different animal species.

Other embodiments of the present disclosure include a computing system. The computing system comprises interface circuitry configured to communicate with a media output device and an input sensor. The computing system further comprises processing circuitry communicatively coupled to the interface circuitry and configured to classify each of a plurality of media units as either having or not having a characteristic of interest by testing the media units using a plurality of non-human animals. To test the media units, the processing circuitry is configured to, for each of the media units, send the media unit to the media output device via the interface circuitry responsive to detecting a non-human animal at a location. The media output device is perceivable by the non-human animal from the location. To test the media units, the processing circuitry is further configured to, for each of the media units, determine the classification of the media unit as either having or not having the characteristic of interest based on data derived, at least in part, from the input sensor. The input sensor is configured to accept input from the non-human animal while the non-human animal is at the location.

In some embodiments, to test the media units using the plurality of non-human animals, the processing circuitry is further configured to detect the non-human animals at a plurality of different locations and send the media units to the different locations as the non-human animals are detected.

In some embodiments, to detect the non-human animal at the location, the processing circuitry is configured to detect that the non-human animal has entered a testing chamber comprising the media output device and the input sensor.

In some embodiments, the processing circuitry is further configured to, responsive to detecting the non-human animal at the location, select a reinforcement scheme from a plurality of reinforcement schemes to provide to the non-human animal, and signal a remote device at the location to reinforce behavior of the non-human animal in accordance with the selected reinforcement scheme based on the data. In some such embodiments, the selected reinforcement scheme comprises providing the non-human animal with sensory stimulus and/or dispensing sustenance.

In some embodiments, to test the media units, the processing circuitry is further configured to, for each of the media units, identify the non-human animal at the location and maintain a historical performance record for the identified non-human animal based on the data derived, at least in part, from the input sensor. In some such embodiments, to maintain the historical performance record for the identified non-human animal, the processing circuitry is configured to track a response time of the non-human animal. In some such embodiments, the processing circuitry is additionally or alternatively configured to detect an anomaly in performance of the identified non-human animal as compared against the historical performance record of the identified non-human animal and transmit a warning regarding a status of the identified non-human animal via the interface circuitry. In some embodiments, to determine the classification of the media unit as either having or not having the characteristic of interest, the processing circuitry is further configured to base the determination on the historical performance record of the identified non-human animal.

In some embodiments, the processing circuitry is further configured to activate a remote device to attract a selected non-human animal of the plurality of non-human animals to the location.

In some embodiments, the processing circuitry is further configured to dynamically generate at least one of the media units from component media parts.

In some embodiments, to classify each of the plurality of media units as either having or not having the characteristic of interest, the processing circuitry is configured to classify each of the plurality of media units as either comprising or not comprising content of interest, respectively.

In some embodiments, the processing circuitry is further configured to determine, for a media unit having the characteristic of interest and based on the data, a segment of the media unit in which the characteristic of interest is present.

In some embodiments, the plurality of non-human animals comprises a plurality of different animal species.

Yet other embodiments include a non-transitory computer readable medium storing software instructions for controlling a programmable computing system. The software instructions, when run on processing circuitry of the programmable computing system, cause the programmable computing system to classify each of a plurality of media units as either having or not having a characteristic of interest by testing the media units using a plurality of non-human animals. The testing comprises, for each of the media units and responsive to detecting a non-human animal at a location, sending the media unit to a media output device perceivable by the non-human animal from the location. The testing further comprises, for each of the media units, determining the classification of the media unit as either having or not having the characteristic of interest based on data derived, at least in part, from an input sensor configured to accept input from the non-human animal while the non-human animal is at the location.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a testing chamber 125, generally, as opposed to discussion of particular instances of testing chambers 125a, 125b).

DETAILED DESCRIPTION

Figure 1:
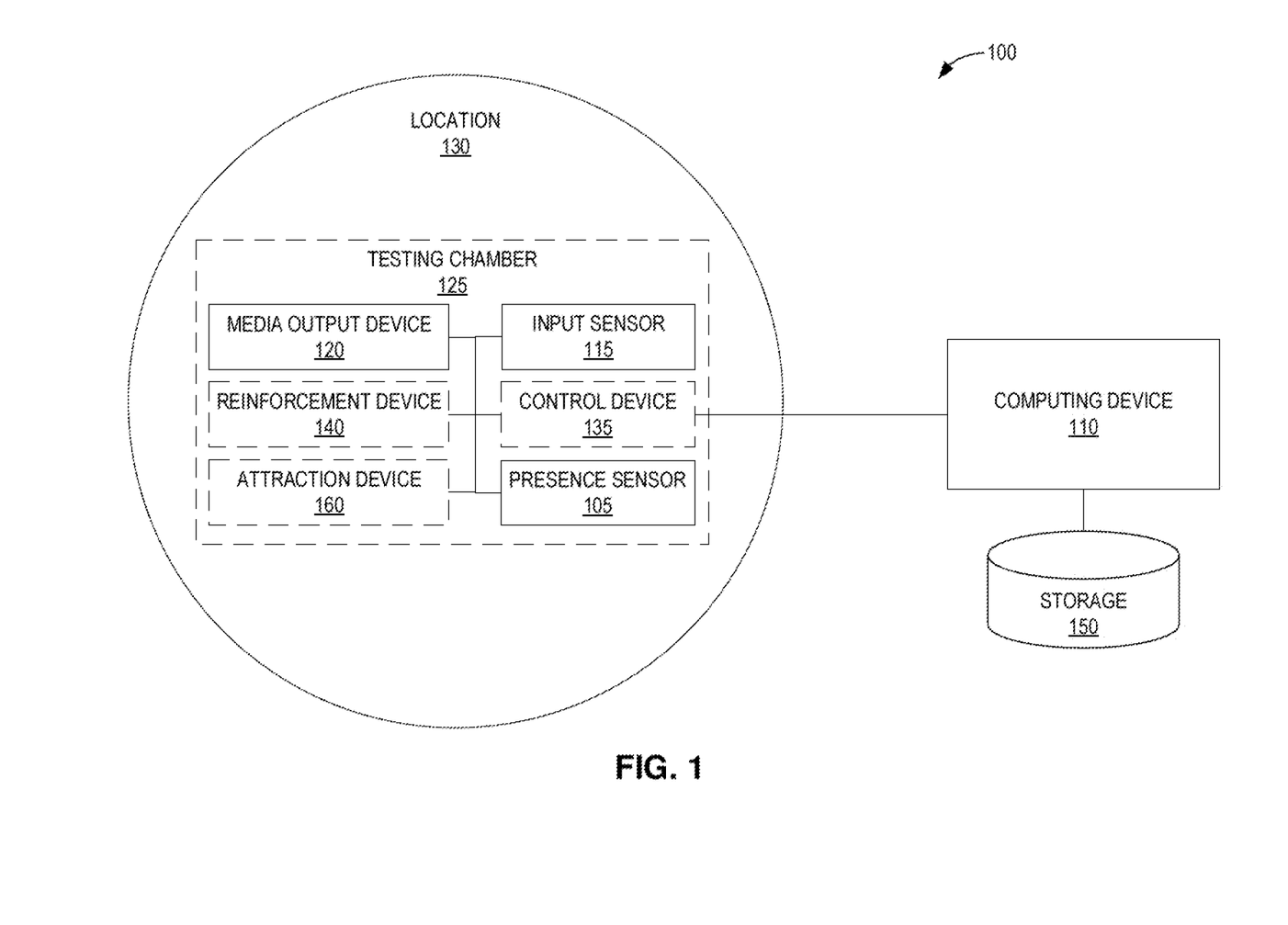
FIG. 1 is a schematic block diagram illustrating an example computing system according to one or more embodiments of the present disclosure.

Turning to the figures, FIG. 1 illustrates an example computing system 100 consistent with particular embodiments of the present disclosure. The computing system 100 comprises a computing device 110, storage 150, an input sensor 115, a presence sensor 105, and a media output device 120. The input sensor 115, presence sensor 105, and media output device 120 are at a location 130. In this example, the location 130 is remote from the computing device 110. Accordingly, the input sensor 115, presence sensor 105, and media output device 120 are communicatively connected to the computing device 110 via one or more physical devices and/or signaling mediums capable of carrying communication signals (e.g., control device 135, a network, a cable, a radio frequency band, a router, a gateway, a switch, a hub, and/or a firewall). Although not shown, these components may be in addition to, or components of, a private network or the Internet at large, for example.

Typical examples of the computing device 110 include a server computer and/or server cluster. Other examples of the computing device 110 include a personal computer, a laptop computer, a desktop computer, a workstation, a smartphone, a tablet computer, a wearable computer, and/or a smart appliance.

Typical examples of the media output device 120 include a display (e.g., a video monitor, a projector and screen, a tactile display, an e-ink display, a dot matrix display) and/or speaker. Other examples of the media output device 120 include a fan configured to blow air over a source of odor and/or a chamber containing an object to be sensed (e.g., touched, tasted, seen, heard, and/or smelled). The input sensor 115 may include, for example, an optical sensor, pressure plate, button, switch, trackpad, keyboard, and/or touch panel. Examples of the presence sensor 105 include a motion, optical (e.g., video camera), heat, pressure, and/or radio frequency identification (RFID) sensor.

Typical examples of storage 150 include network attached storage, a storage area network, a Redundant Array of Independent Disks (RAID), one or more hard drives, one or more solid state drives, volatile memory, and/or non-volatile memory. Although FIG. 1 illustrates storage 150 as connected directly to the computing device 110, according to other embodiments, storage 150 may be comprised in the computing device 110 or may be connected to the computing device 110 by one or more physical devices and/or signaling mediums capable of carrying communication signals.

Typical examples of the control device 135 (in such embodiments of the computing system 100 that include such a device) include a single board computer and/or cluster of single board computers. Other examples of the control device 135 include a server computer and/or server cluster, a personal computer, a laptop computer, a desktop computer, a workstation, a smartphone, a tablet computer, a wearable computer, and/or a smart appliance. As will be discussed in further detail below, the control device 135 may control and/or coordinate operation of the devices and/or sensors at the location 130, e.g., to facilitate the testing of media units at the location 130 as provided by computing device 110. Although the control device 135 is shown in this example as being located at the location 130, the control device 135 may be at other locations depending on the embodiment (e.g. at a nearby building or structure). In particular, the functions of the control device 135 may be integrated into the computing device 110, in some embodiments. Other elements that may be comprised in the computing system 100 of particular embodiments, which will be discussed in further detail below, include a reinforcement device 140 and/or an attraction device 160.

In this example, the computing device 110 sends media units (e.g., images, videos, audio clips) stored in the storage 150 to the media output device 120 (e.g., via the control device 135, if present) to test the media units using a plurality of non-human animals. Such animals may include (but are not limited to) one or more chickens, cows, pigs, dogs, cats, bees, and/or mice, for example. The animals have been trained to behave in a manner that provides input to the input sensor 115 based on whether or not they perceive a media unit as having or not having a characteristic of interest. The input sensor 115 is configured to accept such input from the non-human animals while they are at the location 130, and based on data derived from that input sensor 115 (at least in part), the computing device 110 classifies the media units as either having or not having a characteristic of interest.

As used herein, a media unit has a "characteristic of interest" if the media unit has a particular identifiable quality or attribute. For example, the "characteristic of interest" for images may be images that are in black and white, are dimly lit, are photographs, or are portraits. For audio, the "characteristic of interest" may be audio that is loud or is synthesized. Alternatively, the "characteristic of interest" for images may be whether the image contains some particular "content of interest." As used herein, a media unit has particular "content of interest" if the media unit includes some particular identifiable content. For example, the "content of interest" for images may be an image of a car, a single person's face, a particular person's face, or a particular company's logo. For audio, the "content of interest" may be audio that contains music or human speech. Thus, the characteristic of interest for a given plurality of media units may be the inclusion of certain content of interest. However, classification based on whether or not a media unit has a characteristic of interest does not necessarily include classification based on whether or not a media unit has content of interest, as content is a subset of the set of characteristics that may serve as a basis for classifying media, as used in this disclosure.

To use the non-human animals to test media units (i.e., for a characteristic of interest, or more specifically, for content of interest), the presence sensor 105 notifies the computing device 110 when a non-human animal is present, and the computing device 110 sends a media unit to the media output device 120 in response (e.g., by fetching the media unit from storage 150 and transmitting it to the media output device 120, or by instructing the storage 150 to send the media unit to the media output device 120 itself). An animal at the location 130 perceiving the media unit may then provide (or not provide) input in accordance with its training via the input sensor 115, which correspondingly signals the computing device 110 if/as appropriate. Thus, the computing device 110 may derive data upon which to base a determination as to how to classify the media unit.

For example, storage 150 may comprise a library of images taken by an automated security camera that has been configured to capture an image each time motion is detected. The security camera in this example is unable to distinguish between motion produced by pedestrians walking by (which the owner of the security camera would like to look at more closely) and something else passing by (e.g., cars or birds, which the owner of the security camera would prefer to ignore). Rather than implement a more sophisticated motion detection security solution that produces fewer non-pedestrian images, or have a human comb through the images manually to identify the images of interest (for example), the computing device 110 uses input from animals to classify the library of images into useful subsets; i.e., a pedestrian subset and a non-pedestrian subset. In particular, when such an animal is detected to be at a particular location 130 (e.g., within a testing chamber 125), the computing device 110 sends an image to be tested to a media output device 120 (e.g., a display) located somewhere that can be seen by the animal from the location 130. For example, the media output device 120 may be inside (or within line-of-sight of) a testing chamber 125 so that the animal can provide (or not provide) input via the input sensor 115 as appropriate.

As briefly mentioned above, particular embodiments may also include a reinforcement device 140 at location 130. The reinforcement device 140 is configured to reward the animal for participating in the testing of the media. Typical examples of the reinforcement device 140 include a food and/or water dispenser. In one particular example, the reinforcement device 140 comprises a container configured to retain dispensed food and/or water, an electronically-controlled hopper configured to fill the container, and an actuator and/or motor configured to transfer the food and/or water from the hopper to the container, e.g., in response to signaling from the control device 135 and/or computing device 110. Other examples of the reinforcement device 140 include a speaker that provides behaviorally reinforcing sound (e.g., "good boy"), a toy dispenser/launcher, a tug toy configured to resist pulling by the animal, a fan, and/or a heater.

Particular embodiments may additionally or alternatively include an attraction device 160 at location 130. The attraction device 160 is configured to encourage the animal to participate in the testing of the media. Typical examples of the attraction device 160 include one or more light emitting diodes (LEDs) (e.g., white and/or colored).

It should be noted that, in some embodiments, the media output device 120 may be configured to operate as the reinforcement device 140 and/or the attraction device 160. For example, the media output device 120 may be a speaker configured to operate as the attraction device 160 by playing mating calls or other sounds until an animal is drawn to the testing chamber 125. The media output device 120 may be configured to then output a media unit (e.g., an audio clip) as discussed above. The media output device 120 may be configured to then operate as the reinforcement device 140 by playing pleasant sounds or recordings of praise (e.g., "good dog") based on the animal's interaction with the computing system 100 (e.g., interacting with the input sensor 115). Indeed, any of the example devices discussed above with respect to the media output device 120, reinforcement device 140, and/or attraction device 160 may be configured to operate as any one or more of the media output device 120, reinforcement device 140, and/or attraction device 160. In particular, in some embodiments, the input sensor 115 and the media output device 120 may be components of the same device (e.g., a touchscreen or tablet computer).

Figure 2:
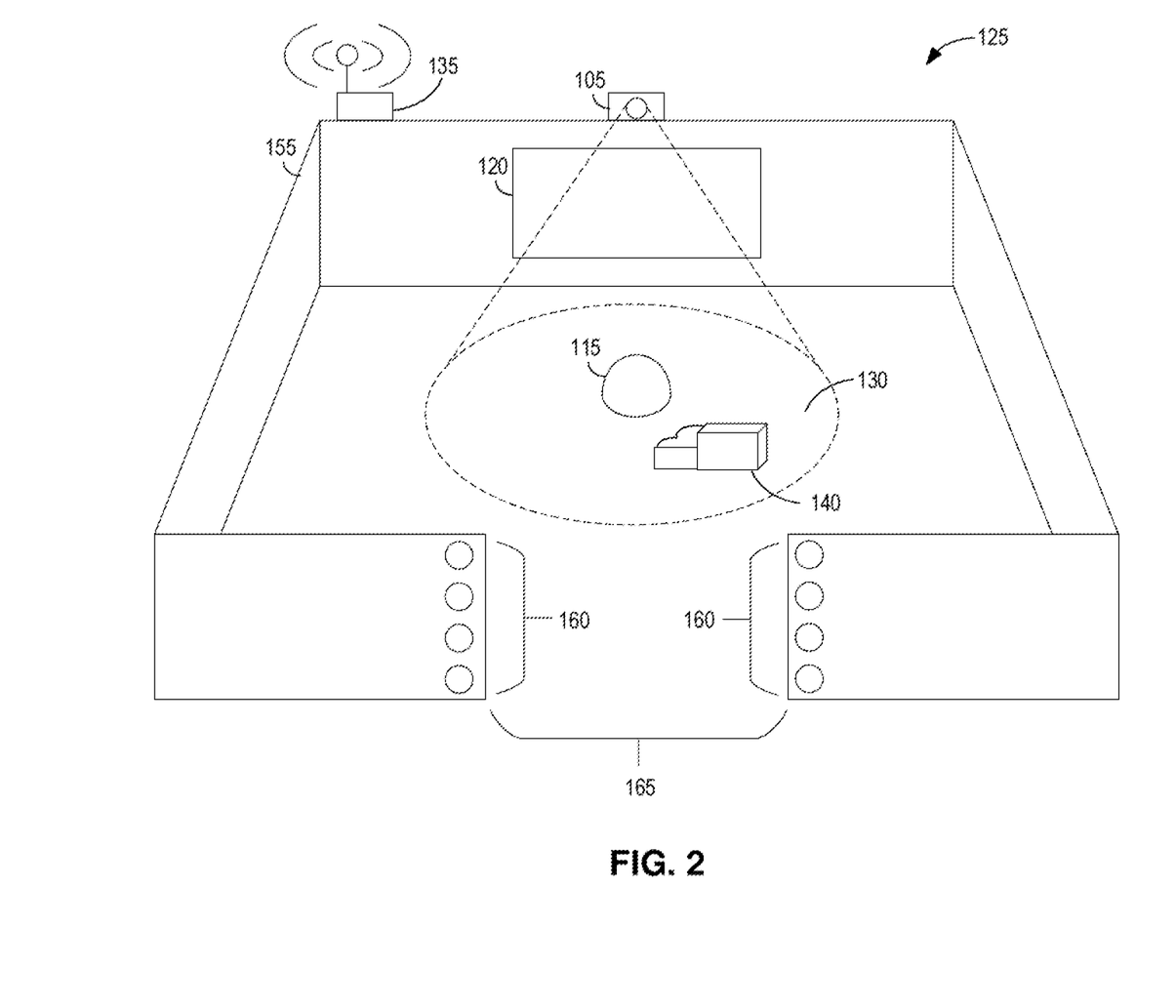
FIG. 2 is a schematic diagram illustrating an example testing chamber, according to one or more embodiments of the present disclosure.

Although not a required feature of all embodiments, FIG. 2 illustrates an example of a testing chamber 125 consistent with particular embodiments of the present disclosure. The testing chamber 125 of this particular example comprises a four-walled enclosure 155 with an opening 165 in one of the walls to permit entry and egress by an animal. An input sensor 115 (i.e., a button, in this example) is disposed within the enclosure 155. A presence sensor 105 (i.e., a camera, in this example) is disposed atop one of the walls of the enclosure 155, and has a field of view of a location 130 around the input sensor 115. A control device 135 is also disposed atop one of the walls of the enclosure. As depicted, the control device 135 is configured to receive media units from a computing device 110 and present the media units on a media output device 120 of the testing chamber 125 (e.g., wirelessly, using a radio interface).

The animal (e.g., a chicken) is able to perceive media output via the media output device 120 (i.e., a display, in this example) from the location 130, and may be trained to actuate the input sensor 115 at the location 130 whenever a person is shown on the media output device 120. According to this particular example, the testing chamber 125 further comprises an attraction device 160 (e.g., LED arrays, as shown in FIG. 2) configured to attract the animal to the testing chamber 125 (e.g., by illuminating or flashing) when there is an image (or other media unit) available to be tested. The testing chamber 125 further comprises a reinforcement device 140 (i.e., a food dispenser, in this example) configured to reward the animal for participating in the testing of one or more media units.

It will be appreciated that although only one location 130, input sensor 115, media output device 120, presence sensor 105, reinforcement device 140, attraction device 160, and testing chamber 125 are shown in FIG. 1 and FIG. 2, other embodiments include one or more of such elements, any or all of which may be at a single location 130 or at one or more other locations 130. Alternatively, in some embodiments, any or all of the input sensors 115, media output devices 120, presence sensors 105, testing chambers 125, attraction devices 160, and/or storage 150 are not part of the computing system 100, but are instead separate components that the computing device 110 interacts with, e.g., to enable performance of one or more of the methods described herein.

Figure 3:
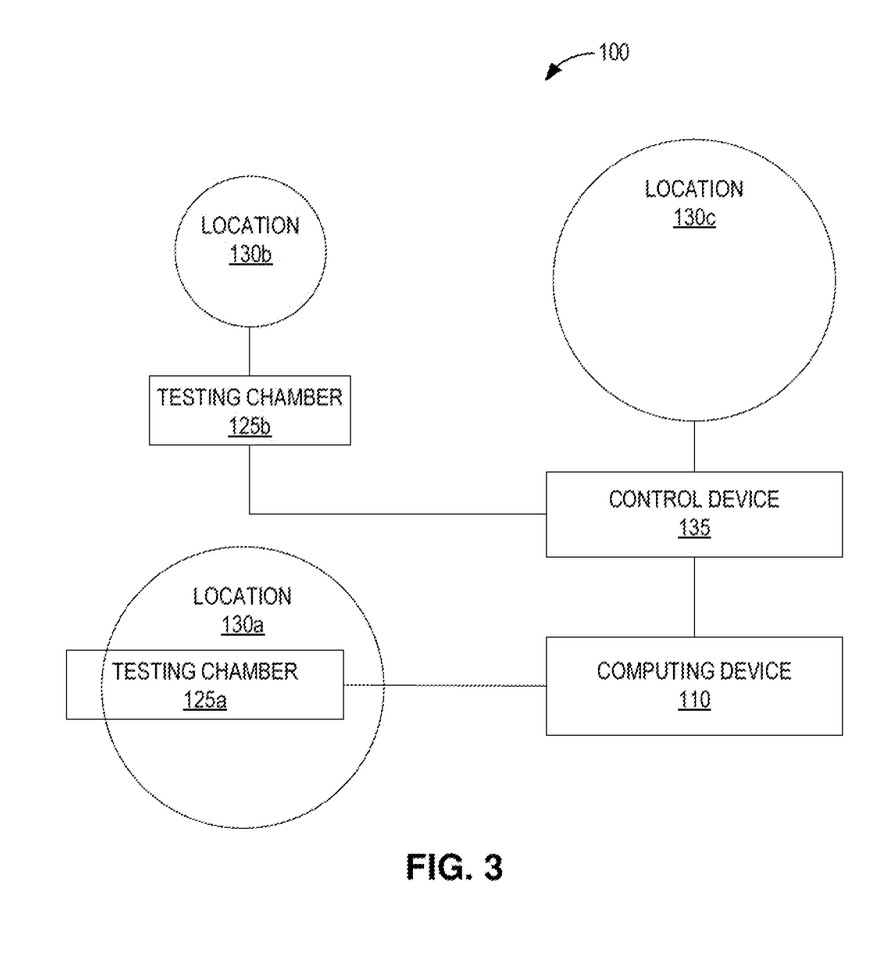
FIG. 3 is a schematic block diagram illustrating an example computing system according to one or more embodiments of the present disclosure.

FIG. 3 illustrates a particular example of the computing system 100 that tests media units using a plurality of differently configured locations 130a-c, any or all of which may be used additionally or alternatively to the configurations shown in FIG. 1 (i.e., in which the testing chamber 125 is located entirely within the location 130) and FIG. 2 (i.e., in which the location 130 is located entirely within the testing chamber 125). In this example, to test a media unit using an animal detected at location 130a, the computing device 110 communicates with the components of a testing chamber 125a associated with location 130a. To test a media unit using an animal detected at location 130b or location 130c, the computing device 110 communicates with control device 135, which is associated with both locations 130b and 130c. Accordingly, to test a media unit using an animal detected at location 130b, the control device 135 communicates with the components of testing chamber 125b associated with location 130b, whereas to test a media unit using an animal detected at location 130c, the control device 135 communicates with devices (e.g., a presence sensor 105, input sensor 115, media output device 120, not shown in FIG. 3) at or near location 130c, which lacks a corresponding testing chamber 125 in this example.

It should further be noted that, although the location 130 of FIG. 2 is depicted as being entirely comprised within the testing chamber 125, other embodiments include a location 130a that is partially outside the testing chamber 125a and/or a location 130b that is entirely outside of the testing chamber 125b. For example, location 130a may be defined by an address, a particular farm, a given building or other structure, and/or within a defined geographic region).

Figure 4:
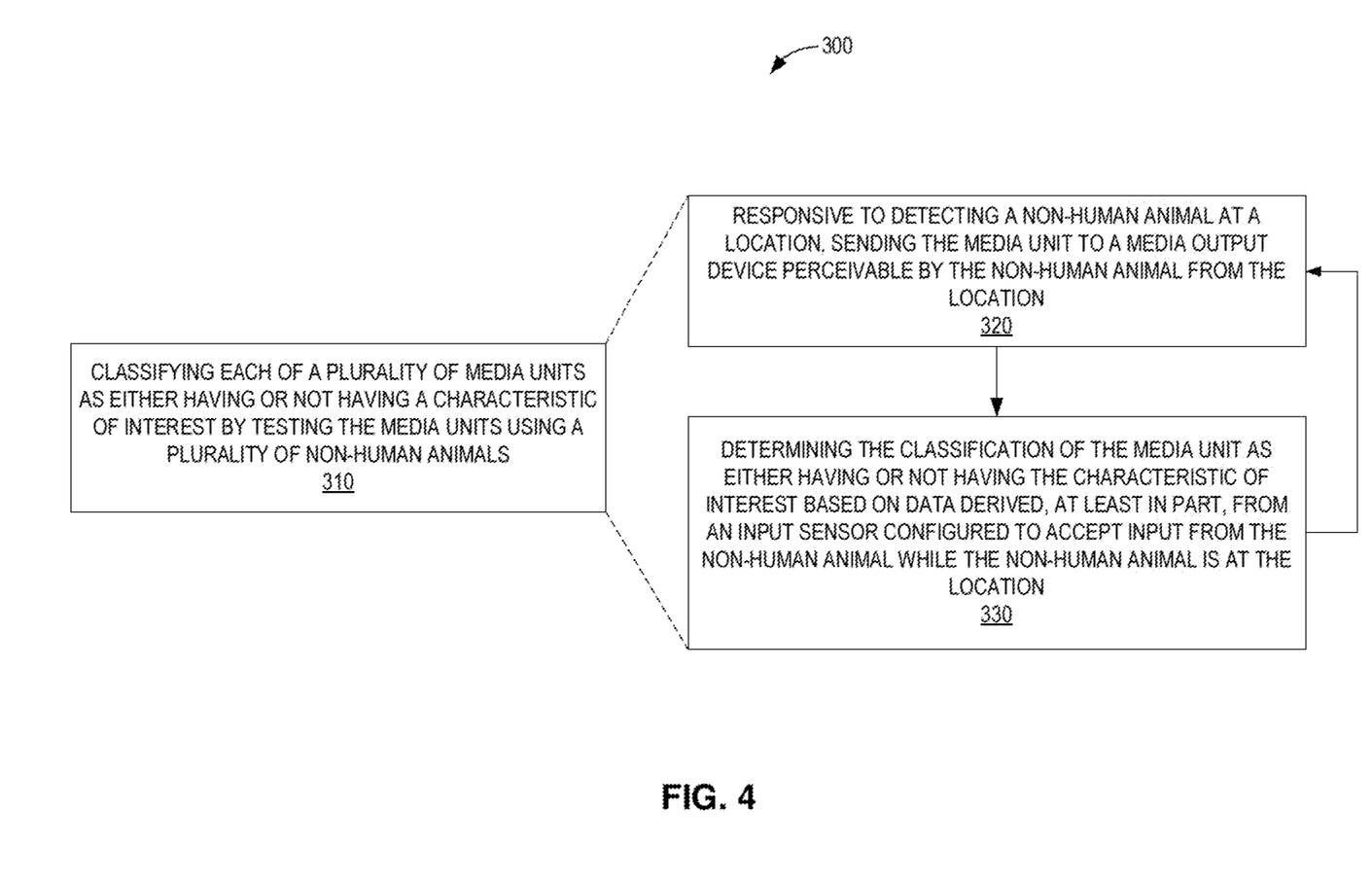
FIGS. 4 and 5 are flow diagrams illustrating example methods, implemented by a computing system, according to one or more embodiments of the present disclosure.

In view of the above and as shown in FIG. 4, embodiments of the present disclosure include a method 300 implemented by a computing system 100. The method 300 comprises classifying each of a plurality of media units as either having or not having a characteristic of interest by testing the media units using a plurality of non-human animals (block 310). The testing comprises, for each of the media units and responsive to detecting a non-human animal at a location 130, sending the media unit to a media output device 120 perceivable by the non-human animal from the location 130 (block 320). The testing further comprises, for each of the media units, determining the classification of the media unit as either having or not having the characteristic of interest based on data derived, at least in part, from an input sensor 115 configured to accept input from the non-human animal while the non-human animal is at the location 130 (block 330).

At least some embodiments consistent with the method 300 of FIG. 4 allow non-human animal input to be considered in the classification of media units. For example, the method 300 may enable animals to assist in determining whether a video stream, an image library and/or an audio repository either has or does not have a characteristic of interest. For example, music historians may wish to understand whether a particular musical instrument is becoming more or less popular over time and send audio samples from storage 150 to the media output device 120 (e.g., a speaker) so that an animal trained to respond to sound of that instrument can provide input via the input sensor 115 accordingly.

Other embodiments consistent with the method 300 may be used to assist a Global Positioning System (GPS) map provider to determine from recent satellite imaging data whether new roads have been constructed. Yet other embodiments consistent with the method 300 may be used by television broadcasters to identify the presence of profane subject matter being revealed to the cameras. Indeed, the potential use cases of embodiments as disclosed herein are myriad. Given the broad applications for which the embodiments discussed above may be suitable, embodiments that include one or more additional features as described herein and/or as illustrated in the method 400 of FIG. 5 may be advantageous.

Figure 5:
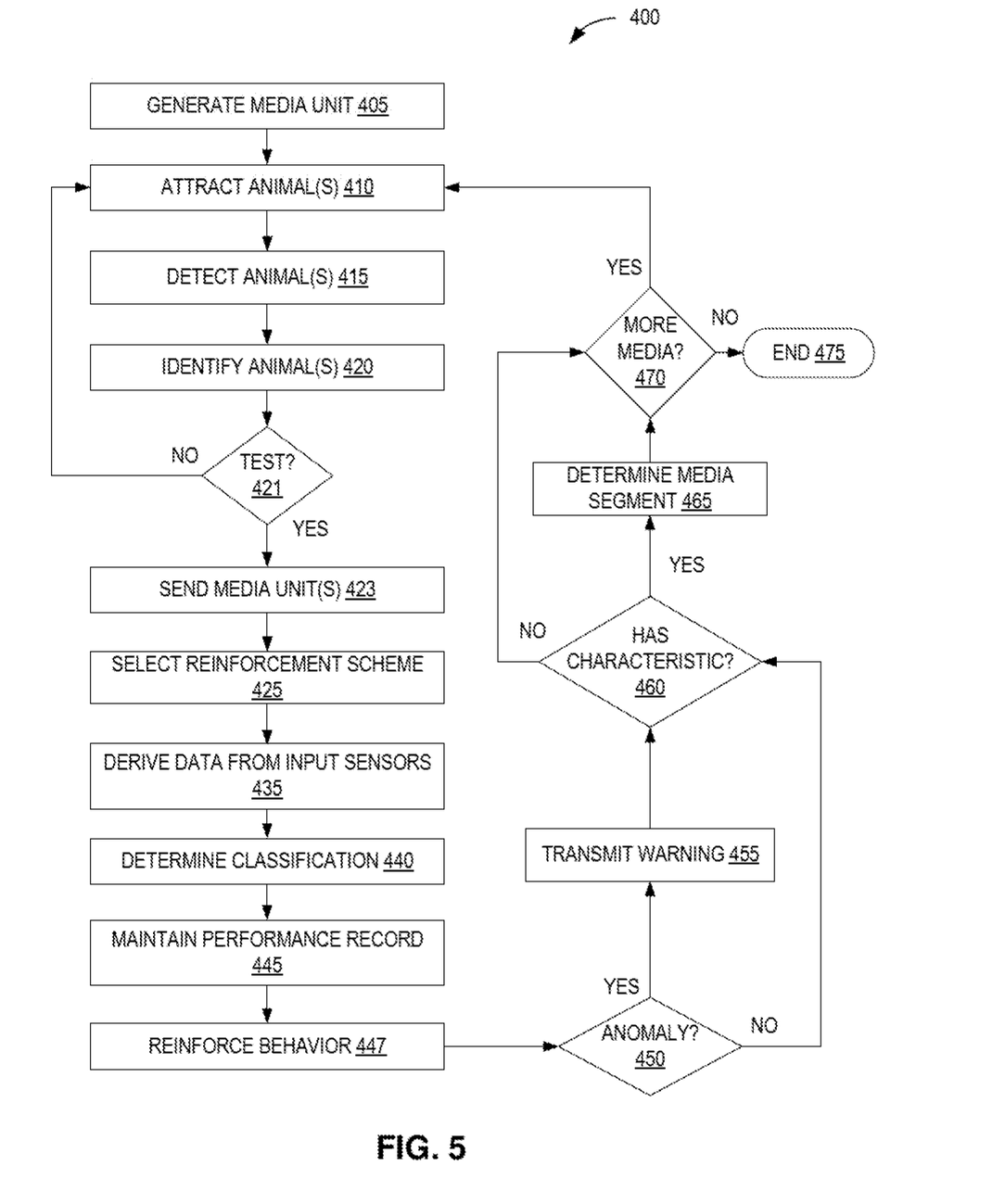

Similar to the method 300 of FIG. 4, the method 400 of FIG. 5 is implemented by a computing system 100 that classifies each of a plurality of media units as either having or not having a characteristic of interest by testing the media units using a plurality of non-human animals. That said, among other things (and as will be discussed further below), the method 400 takes advantage of multiple locations 130, e.g., to enable the testing of media units in parallel, which may be advantageous when the number of media units to be tested is large. Note that in this particular example, the plurality of non-human animals includes a plurality of different animal species (e.g., one or more cats and one or more chickens), which may be advantageous when testing for multiple criteria in which differently trained animals or animals with different natural capabilities would be helpful for providing more accurate and/or detailed feedback, for example.

According to the method 400, the computing device 110 dynamically generates at least one of the media units from component media parts (block 405). For example, the computing device 110 may create original media units that are known to have the characteristic of interest to serve as a control that ensures that the input provided by the animals is reliable. This may involve applying photos of people to different backgrounds and/or at different locations of an image to ensure that the animals can identify that the generated image includes people in it. If the animals are unable to provide appropriate feedback when shown the control media, the computing device 110 may treat previously obtained results differently. For example, the computing device 110 may determine that certain already tested media units need to be retested or may flag previous results as potentially unreliable.

According to the method 400, the computing device 110 activates a remote device (e.g., an attraction device 160) to attract an animal to a location 130 (block 410). Although some embodiments may configure the attraction device 160 to attract any animal available to participate in the testing, other embodiments may configure the attraction device 160 to attract a particular animal selected from the plurality of non-human animals available to be used in the test. For example, the computing device 110 may have a record of the animals available to conduct tests and may even be able to track or determine the location of such animals (e.g., via an electronic tracking device on the animal, by optical detection, or other means). Thus, in some embodiments, the computing device 110 may select a particular animal to attract to a location 130 for testing a media unit. Among other things, the animal may be selected based on its proximity to a testing chamber 125 and/or a historical performance record associated with the animal. For example, a particular animal (e.g., one that is close to a testing chamber 125 and has not been used in a test recently, making this particular animal a suitably responsive and reliable choice) may be selected from the plurality of animals. According to embodiments, animals may be drawn to different locations 130 using various remote attraction devices 160 on an ongoing basis until all of the media units have been tested.

As the method 400 proceeds, the computing device 110 detects the animals at the different locations 130 (block 415). For example, the computing device 110 may receive a signal from a presence sensor 105 at a location 130 indicating that one or more animals has entered a testing chamber 125 near or containing the presence sensor 105, a media output device 120, and an input sensor 115 as described above.

It should be noted that although one or more of the animals may be detected at a location 130 as a result of having been attracted as described above, one or more of the animals may additionally or alternatively be detected at a location 130 by virtue of having visited the location 130 independent of any stimulus provided by the computing system 100.

As the method 400 proceeds, the computing device 110 identifies the animals (block 420) in response to having been detected (block 415). For example, the computing device 110 may rely on the presence sensor 105 at the location 130 to report an identifier of the animal once the animal has been detected. In one such example, the presence sensor 105 is an RFID reader that reads an identifier of the animal from an RFID tag attached to the animal and transmits a signal comprising the identifier over a network to the computing device 110. The computing device 110 detects the animal based on the received signal and identifies the animal based on the identifier comprised therein.

In some embodiments, the computing device 110 may either test or refrain from testing the media unit using this animal, e.g., depending on whether or not the animal meets certain criteria. For example, the computing device 110 may have activated an attraction device 160 to attract a specifically selected animal to a location 130, yet nonetheless identify (e.g., from the identifier received from the presence sensor 105) that the animal actually at the location 130 is different from the one selected. In some such embodiments, this different animal may not be suitable (e.g., trained) to behave in a manner that provides feedback that is relevant to the characteristic of interest upon which classification of the media unit will be made.

Additionally or alternatively, the presence sensor 105 may provide other information about the detected animal on which the computing device 110 may base a determination of whether or not to test the animal. For example, the computing device 110 may determine from telemetry received from the animal via the presence sensor 105 that the animal is tired and/or sick, and is therefore unlikely to provide useful feedback. In response to determining not to test the media unit using the detected animal, the computing device 110 may proceed to attract a different animal to participate in the test (block 410). Otherwise, the computing device 110 may send one or more media unit(s) to be tested to the location 130 (e.g., via a control device 135, to be presented on a media output device 120) (block 423).

In some embodiments (e.g., such as the one illustrated in FIG. 5), the computing device 110 (or control device 135, if present) selects a reinforcement scheme from a plurality of reinforcement schemes to provide to one or more of the animals (block 425). As defined in this disclosure, a reinforcement scheme is a procedure for rewarding the animal for behaving in a manner that is consistent with the manner in which the computing device 110 classifies the media units as either having or not having the characteristic of interest. For example, the reinforcement scheme may include providing a sensory stimulus (e.g., providing a soothing sound) and/or dispensing food using the reinforcement device 140 in response to receiving the input provided by the animal via the input sensor 115. In particular, control media in which the correct classification is already known to the computing device 110 may be used in combination with a reinforcement scheme to encourage and/or train the animals when they provide input that correctly corresponds to that classification. The selected reinforcement scheme may be specific to a particular animal that has been identified, or may be a default reinforcement scheme that would be suitable for any animal in the plurality of animals being used for testing media units that may be at or near the location.

As the method 400 proceeds, with respect to each location 130, the computing device 110 derives data, at least in part, from an input sensor 115 configured to accept input from the animal while the animal is at the location 130 (block 435). For example, the animal may be a chicken that refrains from pecking an input sensor 115 (e.g., button) at the location 130 because the chicken does not perceive the media unit as comprising the characteristic of interest (e.g., a person). The computing device 110 may determine, based on the absence of a button press within a threshold interval of time for example (and possibly in combination with other criteria), that the chicken did not detect a person in the media unit sent to the media output device 120 at the chicken's location 130. Correspondingly, had the chicken pecked the button within the threshold time interval, the computing device 110 may instead determine that the chicken did detect a person in the media unit.

As the method 400 proceeds, the computing device 110 determines the classification of the media unit as either having or not having the characteristic of interest (e.g., particular content of interest) based on data derived, at least in part, from the input sensor 115 (block 440). In some embodiments (such as the one illustrated in FIG. 5), the classification is further based on a historical performance record of the animal used in testing the media unit.

For example, the animal that tested the media unit may have a historical record of pressing the button, if at all, within a 10 second interval 95% of the time, and in this instance, the animal pressed the button after 15 seconds, which is an atypical deviation. Thus, although the animal pressed the button (which would ordinarily signify that the animal identifies the characteristic of interest as being present according to this example), the computing device 110 may determine the classification of the media unit as being not present in view of the inordinately long delay. For example, the button press may have been accidental, or in response to seeing a person somewhere other than on the media output device 120 at the location 130, among other things.

As this particular embodiment includes determining the classification of the media unit based on a historical performance record, the method 400 further comprises maintaining that historical performance record for the identified non-human animal based on the data derived, at least in part, from the input sensor 115 (e.g., tracking a response time of the non-human animal, as described above) (block 445).

Having determined the classification of the media unit and updated the historical performance record, the computing device 110 may signal the reinforcement device 140 (e.g., a speaker, a food dispenser) at the location 130 to reinforce the behavior of the animal in accordance with the selected reinforcement scheme based on the data (block 447). For example, responsive to the data indicating that the animal participated effectively in the testing of a media unit, the computing device 110 may signal the reinforcement device 140 to dispense food, dispense water, play soothing or encouraging sounds and/or provide other stimulus to the animal (as discussed above). In some embodiments, this reinforcement may additionally or alternatively be based on the historical performance record (i.e., in such embodiments in which one is maintained). For example, if the data reveals that the animal is improving its responsiveness to being presented with a media unit, the computing device 110 may signal the reinforcement device 140 to provide a more significant reward. Correspondingly, if the animal is performing poorly relative to its historical performance record, the computing device 110 may signal the reinforcement device 140 to provide a less significant reward, negative feedback, or may omit providing reinforcement altogether.

In some embodiments, the historical performance record of an animal is additionally or alternatively used for one or more other purposes. For example, according to the method 400 of FIG. 5, the computing device 110 uses the historical performance record of the animal to evaluate and make determinations regarding the animal. For example, if the computing device 110 detects an anomaly in performance of the identified non-human animal as compared against its historical performance record (block 450), the computing device 110 may transmit a warning regarding a status of the animal (block 455).

For example, based on the historical performance record of the animal, the computing device 110 may detect that a particular animal has started responding significantly more slowly than it typically does. In response, the computing device 110 may alert a handler of the animal accordingly. Given that a performance anomaly may indicate, among other things, that the animal has fallen ill, embodiments of the present disclosure may be used to assist in preventing the spread of disease to other animals by notifying someone (e.g., by email or text message) that an animal is performing atypically, so that the animal may be quarantined if/as appropriate.

In some embodiments, the computing device 110 may perform other tasks based on whether or not a media unit is determined to have or not have the characteristic of interest. In this particular example, if the computing device 110 determines that a given media unit has the characteristic of interest (block 460), the computing device 110 determines a segment of the media unit in which the characteristic of interest is present (block 465). For example, if the computing device 110 determines that an audio file has jazz music in it, the computing device 110 may determine, based on the data derived, at least in part, from the input sensor 115 at the location 130 of the animal, at what time of the audio file the jazz is located. For example, if the animal did not interact with the input sensor 115 until after 32 seconds have elapsed, the computing device may evaluate the media file for jazz characteristics starting around the 32 second mark and/or determine that the audio file comprises jazz starting at 32 seconds.

Moreover, in some embodiments, the computing device 110 may split a given media unit into a plurality of media segments, present the media segments individually to the animal, and based on further data derived from the input sensor 115, determine which of the plurality of media segments comprises the characteristic of interest. For example, an audio clip may be split into a plurality of audio segments of shorter duration, and the audio segments may be played for the animal one at a time (either in sequence or out of sequence, depending on the particular embodiment). This segmentation may be repeated on segments determined to comprise the characteristic of interest, e.g., to increase the temporal resolution of the determination. That is, according to some embodiments, determining a segment of the media unit in which the characteristic of interest is present comprises iteratively testing increasingly smaller segments of the media unit using the animal at the location 130. For example, the segmentation may be repeated until a segment of a particular threshold size is determined to have the characteristic of interest. Additionally or alternatively, the segmentation may be repeated until none of the sub-segments of a given segment is determined to comprise the characteristic of interest (which may reflect, for example, that the segment is too short for the animal to provide useful feedback to the system).

Depending on the animal's ability to identify the characteristic out of segments of decreasing duration, such sectioning can be used repeatedly to allow determining to a fine temporal resolution where the characteristic exists within the overall audio media unit.

Having fully tested the media unit, the computing device 110 may determine whether there are further media units to be tested (block 470). If so, the computing device 110 may attract another animal as discussed above (block 410). Otherwise, the method 400 may end (block 475). Note that any of the methods discussed herein may be performed repeatedly as additional media units are generated or otherwise obtained that are to be tested.

Many of the embodiments discussed above presume that at least one animal available for testing has been trained to provide feedback useful to the computing system 100 in conducting the test. However, particular embodiments may comprise interaction with an animal that has not yet been trained to provide such useful feedback. Accordingly, embodiments of the present disclosure include techniques for onboarding an animal to participate in the testing conducted by the computing system 100.

For example, if the computing device 110 determines that a particular animal has not yet been onboarded for participation in the above described testing (e.g., at block 421 of method 400), the computing device 110 may decide to perform an onboarding process that trains the animal in how to interact with the computing system 100 (e.g., via an input sensor 115). Additionally or alternatively, if the computing device 110 determines that a particular animal has yet to be trained to provide feedback relevant to the particular test intended for a given media unit, the computing device 110 may train the animal to identify the characteristic of interest relevant to the media unit and/or testing being conducted. In some embodiments, the computing device 110 may decide to use a different animal to test the media unit responsive to determining that the animal has not been onboarded and/or is not trained to identify the characteristic of interest relevant to the media unit being tested (e.g., block 421, "no" path) or may decide to test the animal as discussed above after having performed an onboarding and/or training task.

It should be noted that any of the above methods may be performed by one or more elements of the computing system 100 acting in coordination. For example, the computing system 100 may comprise a computing device 110 and a control device 135 that are communicatively connected (e.g., via a network), each of which is configured to perform one or more of the steps described above. In other embodiments, the method is performed specifically by the computing device 110 of the computing system 100, e.g., using a specially configured processor of the computing device 110.

Detailed hardware components of a computing system 100, consistent with embodiments of the present disclosure as discussed above, are depicted in FIG. 6. The computing system 100 of FIG. 6 comprises processing circuitry 710, memory circuitry 720, and interface circuitry 730, each of which may be comprised in, or shared between, a computing device 110 and/or control device 135, as discussed above. The processing circuitry 710 is communicatively coupled to the memory circuitry 720 and the interface circuitry 730, e.g., via one or more buses and/or networks. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions 760 stored, e.g., as a machine-readable computer program in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination. In some embodiments, the memory circuitry 720 comprises storage 150, as discussed above. Alternatively, storage 150 may be communicatively coupled to the computing system 100 via the interface circuitry 730.

Figure 6:
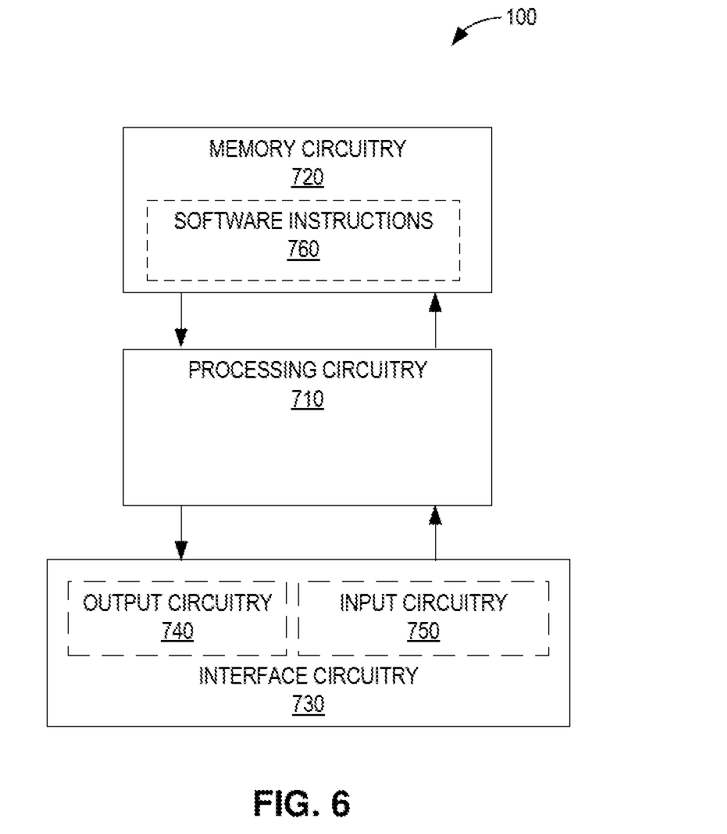
FIG. 6 is a schematic block diagram illustrating example hardware components of a computing system, according to one or more embodiments of the present disclosure.

The interface circuitry 730 may comprise one or more controller hubs configured to control the input and output (I/O) data paths of the computing system 100. Such I/O data paths may include data paths for exchanging signals over a communications network and/or data paths for exchanging signals with a user, e.g., at the computing device 110 and/or at the control device 135. For example, the interface circuitry 730 may comprise a transceiver configured to send and receive communication signals over one or more of a wireless network, electrically-wired network, or optical network (e.g., between any of the elements illustrated in FIG. 1). The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component or as a plurality of physical components that are contiguously or separately arranged, any of which may be communicatively coupled to any other or may communicate with any other via the processing circuitry 710. For example, the interface circuitry 730 may comprise output circuitry 740 (e.g., transmitter circuitry configured to send communication signals over the communications network) and input circuitry 750 (e.g., receiver circuitry configured to receive communication signals over a communications network). Similarly, the output circuitry 740 may comprise a display, whereas the input circuitry 750 may comprise a keyboard. Further, some of the processing circuitry 710 may be configured to operate as the interface circuitry 730 and/or some of the interface circuitry 730 may be configured to operate as the processing circuitry 710. For example, a GPU may be configured to operate as processing circuitry 710 by executing the software instructions 760, then may swap out those software instructions 760 to operate as interface circuitry 730 to control operation of a display or to handle communication over a network. Other examples, permutations, and arrangements of the above and their equivalents will be readily apparent to those of ordinary skill.

According to embodiments of the hardware illustrated in FIG. 6, the processing circuitry 710 is configured to classify each of a plurality of media units as either having or not having a characteristic of interest by testing the media units using a plurality of non-human animals. To test the plurality of media units, the processing circuitry 710 is configured to, for each of the media units and responsive to detecting a non-human animal at a location 130, send the media unit to a media output device 120 perceivable by the non-human animal from the location 130 and determine the classification of the media unit as either having or not having the characteristic of interest based on data derived, at least in part, from an input sensor 115 configured to accept input from the non-human animal while the non-human animal is at the location 130.

Other embodiments include a non-transitory computer readable medium storing software instructions 760 for controlling a programmable computing device 110, wherein the software instructions 760, when executed by processing circuitry 710 of the programmable computing device 110, cause the programmable computing device 110 to perform any of the methods described herein.

The present invention may, of course, be carried out in other ways than those specifically set forth herein without departing from the essential characteristics of the invention. The present embodiments are to be considered in all respects as illustrative and not restrictive, and all changes coming within the meaning and equivalency range of the appended claims are intended to be embraced therein.

What is claimed is:

1. A method comprising:
receiving first input indicating that a designated non-human animal is at a location, wherein the designated non-human animal is pre-trained by exposure to a plurality of training media units known to exhibit a characteristic of interest;
presenting a testing media unit that may exhibit the characteristic of interest on a media output device at the location;
receiving second input from an input sensor configured to accept input from the designated non-human animal while the designated non-human animal is located at the location;
classifying the testing media unit via a control device as either exhibiting or not exhibiting the characteristic of interest based at least in part on the second input; and
storing an indication as to whether the testing media unit exhibits the characteristic of interest.

2. The method recited in claim 1, wherein the testing media unit is presented to a plurality of non-human animals including the designated non-human animal, and wherein classifying the testing media unit as either exhibiting or not exhibiting the characteristic of interest based at least in part on the second input is based at least in part on a plurality of input signals received from the plurality of non-human animals.

3. The method recited in claim 1, the method further comprising:
identifying the designated non-human animal, the designated non-human animal being one of a plurality of non-human animals having provided input at the location.

4. The method recited in claim 1, the method further comprising:
updating a historical performance record based at least in part on the second input.

5. The method recited in claim 4, wherein the historical performance record is specific to the designated non-human animal.

6. The method recited in claim 4, wherein whether the testing media unit exhibits the characteristic of interest is determined at least in part based on the historical performance record.

7. The method recited in claim 4, the method further comprising:
determining a response time between presenting of the testing media unit and receiving the second input; and
storing the response time in the historical performance record.

8. The method recited in claim 4, the method further comprising:
detecting an anomaly based at least in part on the historical performance record.

9. The method recited in claim 8, the method further comprising:
based at least in part on the anomaly, transmitting a warning message regarding a status of the designated non-human animal.

10. The method recited in claim 1, the method further comprising:
signaling a reinforcement device at the location to reinforce behavior of the designated non-human animal in accordance with a designated reinforcement scheme based on the second input.

11. The method recited in claim 10, the method further comprising:
identifying the designated non-human animal, the designated non-human animal being one of a plurality of non-human animals having provided input at the location
selecting the designated reinforcement scheme from a plurality of reinforcement schemes to provide to the identified designated non-human animal.

12. The method recited in claim 1, the method further comprising:
dynamically generating the testing media unit based on a plurality of component media parts.

13. The method recited in claim 1, the method further comprising:

activating an attraction device to attract the designated non-human animal to the location.

14. The method recited in claim 1, wherein the location comprises a testing chamber and a presence sensor, and wherein the first input is received from the presence sensor when the designated non-human animal enters the testing chamber.

15. The method recited in claim 14, wherein the testing chamber is an enclosure comprising a plurality of walls and an opening in one of the walls.

16. The method recited in claim 1, wherein the designated non-human animal is selected from the group consisting of: a cow, a chicken, and a pig.

17. The method recited in claim 1, the method further comprising:
based at least in part on the second input, identifying a first segment of the testing media unit that includes the identified characteristic and a second segment of the testing media unit that does not include the identified characteristic.

18. The method recited in claim 1, wherein the designated non-human animal is a chicken, and wherein the testing media unit is an image, and wherein the characteristic of interest is a person.

19. A system comprising:
a presence sensor configured to receive first input indicating that a designated non-human animal is at a location, wherein the designated non-human animal is pre-trained by exposure to a plurality of training media units known to exhibit a characteristic of interest;
a media output device configured to present at the location a testing media unit that may exhibit the characteristic of interest;
an input sensor configured to accept second input from the designated non-human animal while the designated non-human animal is located at the location; and
a control device configured to classify the testing media unit as either exhibiting or not exhibiting the characteristic of interest based at least in part on the second input and to store an indication as to whether the testing media unit exhibits the characteristic of interest.

20. The system recited in claim 19, wherein the testing media unit is presented to a plurality of non-human animals including the designated non-human animal, and wherein classifying the testing media unit as either exhibiting or not exhibiting the characteristic of interest based at least in part on the second input is based at least in part on a plurality of input signals received from the plurality of non-human animals.

21. The system recited in claim 20, wherein the location comprises a testing chamber, and wherein the first input is received from the presence sensor when the designated non-human animal enters the testing chamber.

22. The system recited in claim 21, wherein the testing chamber is an enclosure comprising a plurality of walls and an opening in one of the walls.

23. The system recited in claim 20, wherein the designated non-human animal is a chicken, and wherein the testing media unit is an image, and wherein the characteristic of interest is a person.

24. The system recited in claim 19, wherein the control device is further configured to identify the designated non-human animal, the designated non-human animal being one of a plurality of non-human animals having provided input at the location.

25. The system recited in claim 19, wherein the control device is further configured to update a historical performance record based at least in part on the second input.

26. The system recited in claim 25, wherein whether the testing media unit exhibits the characteristic of interest is determined at least in part based on the historical performance record.

27. The system recited in claim 25, wherein the control device is further configured to determine a response time between presenting of the testing media unit and receiving the second input and to store the response time in the historical performance record.

28. The system recited in claim 25, wherein the control device is further configured to detect an anomaly based at least in part on the historical performance record and to transmit a warning message regarding a status of the designated non-human animal based at least in part on the anomaly.

29. One or more non-transitory computer readable media having instructions stored therein for performing a method, the method comprising:
receiving first input indicating that a designated non-human animal is at a location, wherein the designated non-human animal is pre-trained by exposure to a plurality of training media units known to exhibit a characteristic of interest;
presenting a testing media unit that may exhibit the characteristic of interest on a media output device at the location;
receiving second input from an input sensor configured to accept input from the designated non-human animal while the designated non-human animal is located at the location;
classifying the testing media unit via a control device as either exhibiting or not exhibiting the characteristic of interest based at least in part on the second input; and
storing an indication as to whether the testing media unit exhibits the characteristic of interest.

* * * * *